US012333933B2

(12) United States Patent
Foster

(10) Patent No.: US 12,333,933 B2
(45) Date of Patent: Jun. 17, 2025

(54) FIREARM ALERTING SYSTEM

(71) Applicant: Jerome Foster, Hammond, IN (US)

(72) Inventor: Jerome Foster, Hammond, IN (US)

( * ) Notice: Subject to any disclaimer, the term of this patent is extended or adjusted under 35 U.S.C. 154(b) by 0 days.

(21) Appl. No.: 17/981,431

(22) Filed: Nov. 6, 2022

(65) Prior Publication Data

US 2024/0153378 A1 May 9, 2024

(51) Int. Cl.
*G08B 23/00* (2006.01)
*G08B 21/02* (2006.01)
*G08G 1/017* (2006.01)

(52) U.S. Cl.
CPC ............. *G08G 1/017* (2013.01); *G08B 21/02* (2013.01)

(58) Field of Classification Search
CPC ................................ G08G 1/017; G08B 21/02
See application file for complete search history.

(56) References Cited

U.S. PATENT DOCUMENTS 5,381,155 A * 1/1995 Gerber .................. G08G 1/054 340/936
5,408,330 A * 4/1995 Squicciarini ........... H04N 7/188 386/314
5,515,042 A * 5/1996 Nelson .................. G08G 1/054 340/936
5,847,661 A * 12/1998 Ricci ................ G08G 1/096716 340/447
5,938,717 A * 8/1999 Dunne .................. G03B 7/093 701/119
5,952,941 A * 9/1999 Mardirossian ........... G08G 1/01 340/936
6,121,898 A * 9/2000 Moetteli ................ G08G 1/052 340/936
6,161,066 A * 12/2000 Wright ................. B60Q 1/2611 340/472
6,913,199 B2 * 7/2005 He ..................... G06K 7/10851 235/447
7,412,078 B2 * 8/2008 Kim ....................... G08G 1/054 382/105
8,754,751 B1 * 6/2014 Picolli ................... G01S 13/751 455/562.1
9,189,788 B1 11/2015 Robinson et al.
9,639,899 B1 * 5/2017 Gersitz .................... H04W 4/02
9,752,840 B1 * 9/2017 Betro ..................... H04W 4/029
9,773,137 B2 * 9/2017 Yonekura ................. H04B 7/00
9,946,734 B2 * 4/2018 Ekin ........................ G08G 1/04
(Continued)

*Primary Examiner* — Quang Pham
(74) *Attorney, Agent, or Firm* — Mark A. McCormick

(57) ABSTRACT

A firearm alerting system installed on the exterior of a law enforcement vehicle is presented. The firearm alerting system provides law enforcement officers advance notification of a possible firearm in a suspect vehicle they have pulled over. The law enforcement vehicle is of a conventional design and may be marked or unmarked. The law enforcement vehicle is provided with one or more sensors capable of discerning text-based elements at a distance, envisioned to be vehicle license plates. The sensors may be an electronic camera or similar sensor equipped with artificial intelligence (AI) to discern text-based indicia and process it into readily recognizable file. Said sensor is envisioned to be provided with a forward-facing view that would be advantageous in a traffic stop by the law enforcement vehicle when the law enforcement vehicle approaches the subject vehicle from behind.

20 Claims, 4 Drawing Sheets

(56) References Cited

U.S. PATENT DOCUMENTS

| | | | | |
|---|---|---|---|---|
| 10,171,476 | B2 * | 1/2019 | Khan | H04L 9/3234 |
| 10,380,619 | B2 | 8/2019 | Pontious | |
| 10,453,159 | B2 | 10/2019 | Kapczynski | |
| 10,692,304 | B1 * | 6/2020 | Deyaf | G08G 1/202 |
| 10,755,371 | B1 * | 8/2020 | Sarpy, Sr. | G06Q 50/26 |
| 10,837,723 | B2 * | 11/2020 | Black | G08B 15/004 |
| 10,845,142 | B2 * | 11/2020 | Flood | F41A 9/62 |
| 10,867,219 | B2 * | 12/2020 | Koskan | G06V 20/10 |
| 10,946,793 | B1 * | 3/2021 | Ekin | G08G 1/052 |
| 10,957,189 | B1 * | 3/2021 | Valeri | B60Q 9/00 |
| 11,144,749 | B1 * | 10/2021 | Lo | G08B 13/19669 |
| 11,164,027 | B2 | 11/2021 | Wang et al. | |
| 11,227,164 | B2 * | 1/2022 | Sharma | G06V 20/52 |
| 11,320,829 | B2 * | 5/2022 | Ekin | G08B 25/014 |
| 11,443,606 | B2 * | 9/2022 | Baker | G07C 9/00309 |
| 11,615,282 | B2 * | 3/2023 | Muppirala | G08G 1/0112<br>235/380 |
| 2002/0080013 | A1 * | 6/2002 | Anderson, III | G07C 5/0891<br>340/936 |
| 2004/0104813 | A1 * | 6/2004 | Rau | G08G 1/0175<br>340/901 |
| 2004/0140355 | A1 * | 7/2004 | Grison | G07B 15/00<br>235/384 |
| 2005/0262751 | A1 * | 12/2005 | Leslie | F41A 17/063<br>42/70.01 |
| 2006/0214783 | A1 * | 9/2006 | Ratnakar | G08G 1/0175<br>340/505 |
| 2008/0068170 | A1 * | 3/2008 | Ehrman | G06Q 10/08<br>340/572.1 |
| 2008/0238719 | A1 * | 10/2008 | Marchasin | G08G 1/017<br>340/901 |
| 2009/0244293 | A1 * | 10/2009 | Schaffner | G06Q 90/00<br>345/173 |
| 2013/0033386 | A1 * | 2/2013 | Zlojutro | G06Q 50/26<br>340/935 |
| 2013/0279757 | A1 * | 10/2013 | Kephart | G06Q 50/265<br>382/105 |
| 2014/0259841 | A1 * | 9/2014 | Carlson | F41A 17/08<br>42/70.11 |
| 2014/0306826 | A1 * | 10/2014 | Ricci | G05D 1/0016<br>340/573.1 |
| 2014/0366421 | A1 * | 12/2014 | Arif | F41A 17/46<br>42/70.11 |
| 2015/0332023 | A1 * | 11/2015 | Gisolfi | H04L 63/123<br>726/31 |
| 2015/0369554 | A1 * | 12/2015 | Kramer | H04N 9/806<br>386/227 |
| 2016/0267451 | A1 * | 9/2016 | Eid | G06K 19/07758 |
| 2016/0358017 | A1 * | 12/2016 | Guzik | G06V 20/59 |
| 2017/0010062 | A1 * | 1/2017 | Black | F41J 5/10 |
| 2017/0076140 | A1 * | 3/2017 | Waniguchi | G06V 20/20 |
| 2018/0050800 | A1 * | 2/2018 | Boykin | H04N 21/2368 |
| 2019/0272743 | A1 * | 9/2019 | Henry | G08G 5/0069 |
| 2019/0293375 | A1 * | 9/2019 | Urwin-Wright | G01V 3/10 |
| 2019/0304297 | A1 * | 10/2019 | Burley, IV | G08G 1/04 |
| 2019/0378363 | A1 * | 12/2019 | Becker | G05D 1/0221 |
| 2020/0097708 | A1 * | 3/2020 | Thompson | G06V 20/56 |
| 2020/0097726 | A1 * | 3/2020 | Gurule | H04N 21/8583 |
| 2020/0273497 | A1 * | 8/2020 | Ooyabu | H04R 3/005 |
| 2020/0387992 | A1 * | 12/2020 | Vij | H04W 4/021 |
| 2021/0125015 | A1 * | 4/2021 | Muppirala | G06Q 50/26 |
| 2021/0174197 | A1 * | 6/2021 | Georgis | H04L 65/75 |
| 2021/0394764 | A1 * | 12/2021 | Clines | G06F 16/93 |
| 2022/0068127 | A1 * | 3/2022 | Lykkja | G08G 1/017 |
| 2022/0100798 | A1 * | 3/2022 | Donaldson | G06F 40/205 |
| 2022/0113102 | A1 * | 4/2022 | Mogaka | H04W 4/33 |
| 2022/0277598 | A1 * | 9/2022 | Liu | H04W 4/44 |

* cited by examiner

FIREARM ALERTING SYSTEM

FIELD OF THE INVENTION

This invention relates to a firearm alerting system. In particular, this invention relates to a firearm alerting system installed on a law enforcement vehicle.

BACKGROUND

An optical character recognition or optical character reader is also identified with the acronym (OCR) is an electronic or mechanical conversion of images of typed, handwritten or printed text into machine-encoded text, whether from a scanned document, a photo of a document, a scene-photo (for example the text on signs and billboards in a landscape photo) or from subtitle text superimposed on an image. An optical character recognition or optical character reader is also identified with the acronym (OCR).

Widely used as a form of data entry from printed paper data records—whether passport documents, invoices, bank statements, computerized receipts, business cards, mail, printouts of static-data, or any suitable documentation—it is a common method of digitizing printed texts so that they can be electronically edited, searched, stored more compactly, displayed on-line, and used in machine processes such as cognitive computing, machine translation, (extracted) text-to-speech, key data and text mining. OCR is a field of research in pattern recognition, artificial intelligence, and computer vision.

Automatic number-plate recognition (ANPR; see also other names below) is a technology that uses optical character recognition on images to read vehicle registration plates to create vehicle location data. It can use existing closed-circuit television, road-rule enforcement cameras, or cameras specifically designed for the task. ANPR is used by police forces around the world for law enforcement purposes, including to check if a vehicle is registered or licensed. ANPR uses optical character recognition (OCR).

Some license plate arrangements use variations in font sizes and positioning—ANPR systems must be able to cope with such differences to be truly effective. More complicated systems can cope with international variants, though many programs are individually tailored.

The cameras used can be existing road-rule enforcement or closed-circuit television cameras, as well as mobile units, which are usually attached to vehicles. Some systems use infrared cameras to take a clearer image of the plates.

During the 1990s, significant advances in technology took automatic number-plate recognition (ANPR) systems from limited expensive, hard to set up, fixed based applications to simple "point and shoot" mobile ones. This was made possible by the creation of software that ran on cheaper PC based, non-specialist hardware that also no longer needed to be given the pre-defined angles, direction, size and speed in which the plates would be passing the camera's field of view. Further scaled-down components at lower price points led to a record number of deployments by law enforcement agencies globally. Smaller cameras with the ability to read license plates at higher speeds, along with smaller, more durable processors that fit in the trunks of police vehicles, allowed law enforcement officers to patrol daily with the benefit of license plate reading in real time, when they can interdict immediately.

Relative speed is only one issue that affects the camera's ability to read a license plate. Algorithms must be able to compensate for all the variables that can affect the ANPR's ability to produce an accurate read, such as time of day, weather and angles between the cameras and the license plates. A system's illumination wavelengths can also have a direct impact on the resolution and accuracy of a read in these conditions.

Installing ANPR cameras on law enforcement in the vehicles requires careful consideration of the juxtaposition of the cameras to the license plates they are to read. Using the right number of cameras and positioning them accurately for optimal results can prove challenging, given the various missions and environments at hand. Highway patrol requires forward-looking cameras that span multiple lanes and are able to read license plates at high speeds. City patrol needs shorter range, lower focal length cameras for capturing plates on parked cars. Parking lots with perpendicularly parked cars often require a specialized camera with a very short focal length. Most technically advanced systems are flexible and can be configured with a number of cameras ranging from one to four which can easily be repositioned as needed.

With all the tracking that currently exists today in law enforcement there is no way to identify an owner of a moving vehicle with ownership/registration of a gun. The lack of this tracking poses a threat to the safety of the law enforcement.

Accordingly, and in light of the foregoing, it would be desirable to have tracking that is able to use the license plate of a vehicle as a searchable entity into any and all databases related to gun ownership. If it is found that the vehicle owner has a registered gun, it alerts law enforcement that a gun may possibly be in the vehicle being addressed. This will allow the law enforcement to take extra precaution therefore providing a safer environment for them.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
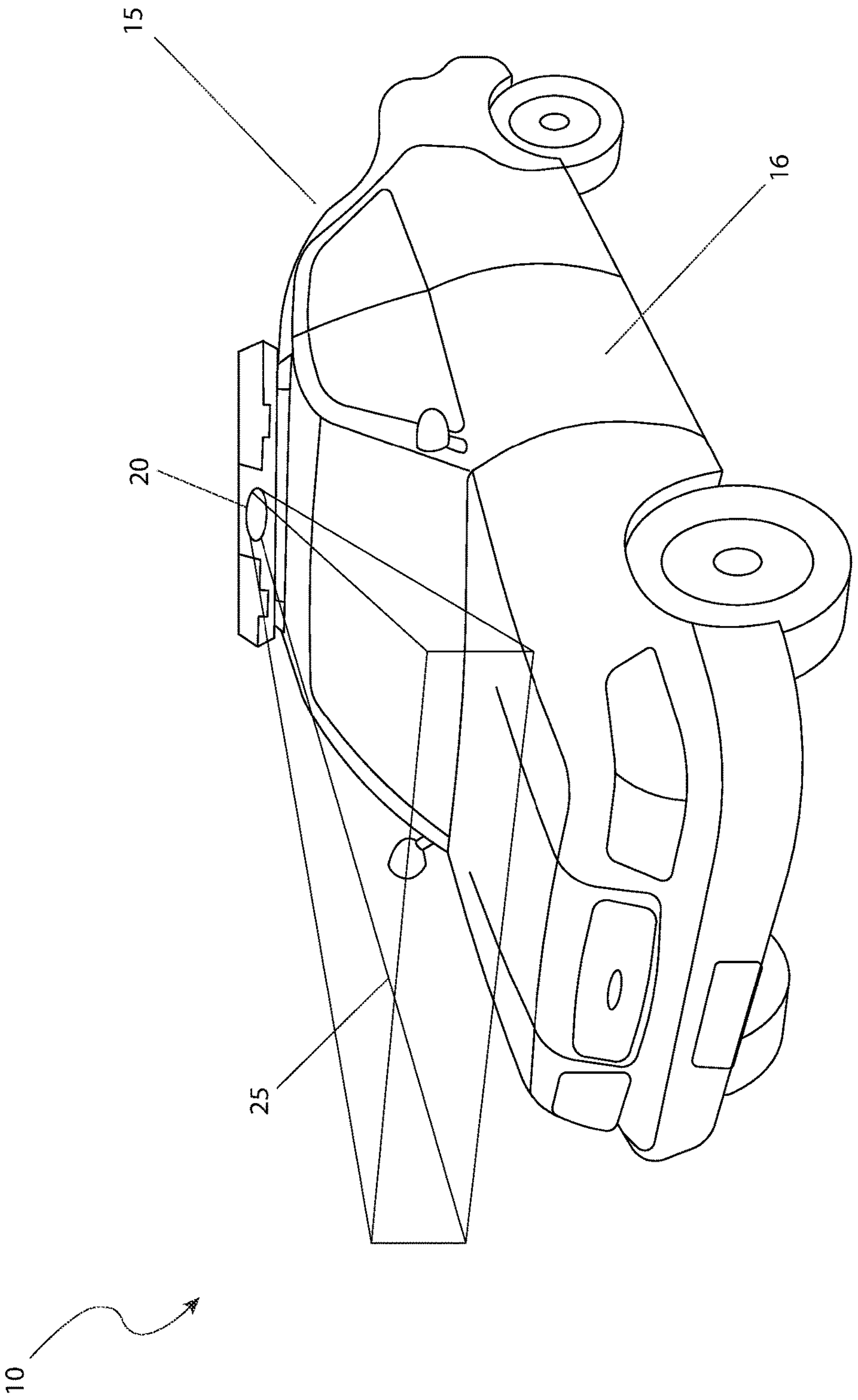
FIG. 1 is a front view of the firearm alerting system 10, installed on the exterior 16 of a law enforcement vehicle 15, according to the preferred embodiment of the present invention.

10 firearm alerting system
15 law enforcement vehicle
20 sensor
25 forward facing view
30 interior
35 electronic display
40 law enforcement officer
45 suspect vehicle
50 license plate
55 license plate text information 60 possible firearm present indicia
95 radio communication site
70 radio frequency (RF) waves
75 internet
80 firearm database
85 concealed carry permit database
90 firearm owner database
95 prior criminal activity with a firearm database
100 license plate database

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the firearm alerting system 10, installed on the exterior 16 of a law enforcement vehicle 15, according to the preferred embodiment of the present invention is disclosed. The firearm alerting system 10 (herein also described as the "system") 10, provides law enforcement officers 40 advance notification of a possible firearm in a suspect vehicle 45 they have pulled over. The law enforcement vehicle 15 is of a conventional design and may be marked (as shown) or unmarked. The law enforcement vehicle 15 is provided with one (1) or more sensors 20 capable of discerning text-based elements at a distance, envisioned to be vehicle license plates. The sensors 20 may be an electronic camera or similar sensor equipped with artificial intelligence (AI) to discern text-based indicia and process it into readily recognizable file. The use of any specific type or style of sensor 20 is not intended to be a limiting factor of the present invention. Said sensor 20 is envisioned to be provided with a forward-facing view 25 that would be advantageous in a traffic stop by the law enforcement vehicle 15 when the law enforcement vehicle 15 approaches the subject vehicle from behind.

Figure 2:
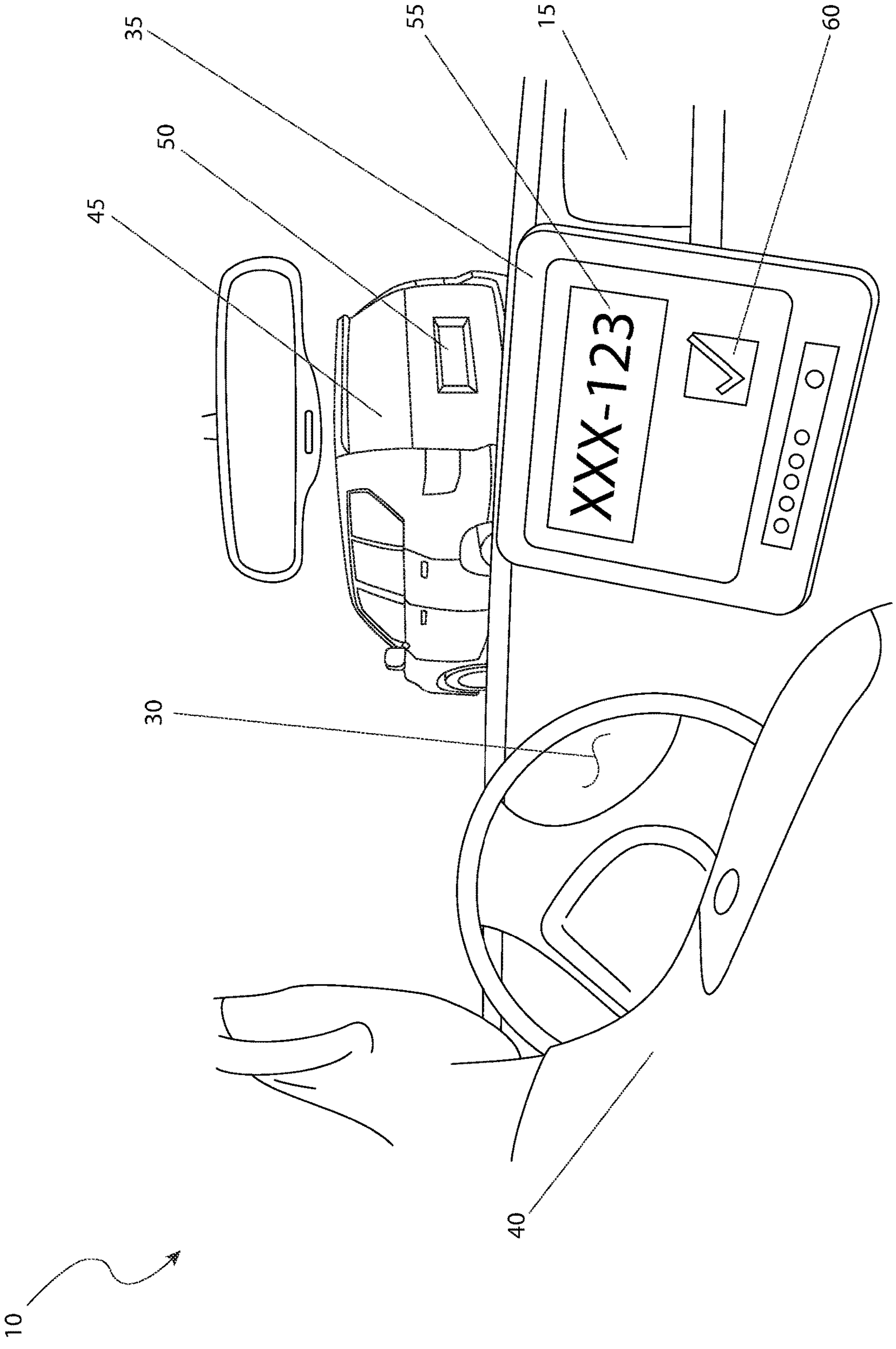
FIG. 2 is an interior view of law enforcement vehicle 15 with the firearm alerting system 10 installed, according to the preferred embodiment of the present invention.

Referring next to FIG. 2, an interior view of law enforcement vehicle 15 with the system 10 installed, according to the preferred embodiment of the present invention is depicted. The interior 30 of the law enforcement vehicle 15 is provided with an electronic display 35 that is visible to one (1) or more law enforcement officer 40. The law enforcement vehicle 15 is in the process of pulling over a suspect vehicle 45 for any reason. The system 10 will analyze and detect the license plate 50 of the suspect vehicle 45 and provide various alerting indicia on the electronic display 35. The electronic display 35 may be dedicated to the system 10 or be part of other electronic systems provided in the law enforcement vehicle 15, including but not limited to: speed detection system, mobile data terminals (MDT's), dispatch systems, communication systems, or the like. At a minimum, the electronic display 35 would provide license plate text information 55 from which the law enforcement officer 40 may perform a visual match with the license plate 50 on the suspect vehicle 45 and a possible firearm present indicia 60. The possible firearm present indicia 60 would be activated by the system 10 whenever the system 10 matches the license plate 50 to one (1) or more firearm databases 80. The firearm databases 80 will be described in greater detail herein below.

The possible firearm present indicia 60 would be provided in near real time and would be readily available by the time the law enforcement officer 40 exits the law enforcement vehicle 15 and approaches the suspect vehicle 45. As such, the law enforcement officer 40 would be warned and alerted to be cautious for the presence of a firearm and the possibility of being ambushed, thus greatly improving the overall safety of the law enforcement vehicle 15.

Figure 3:
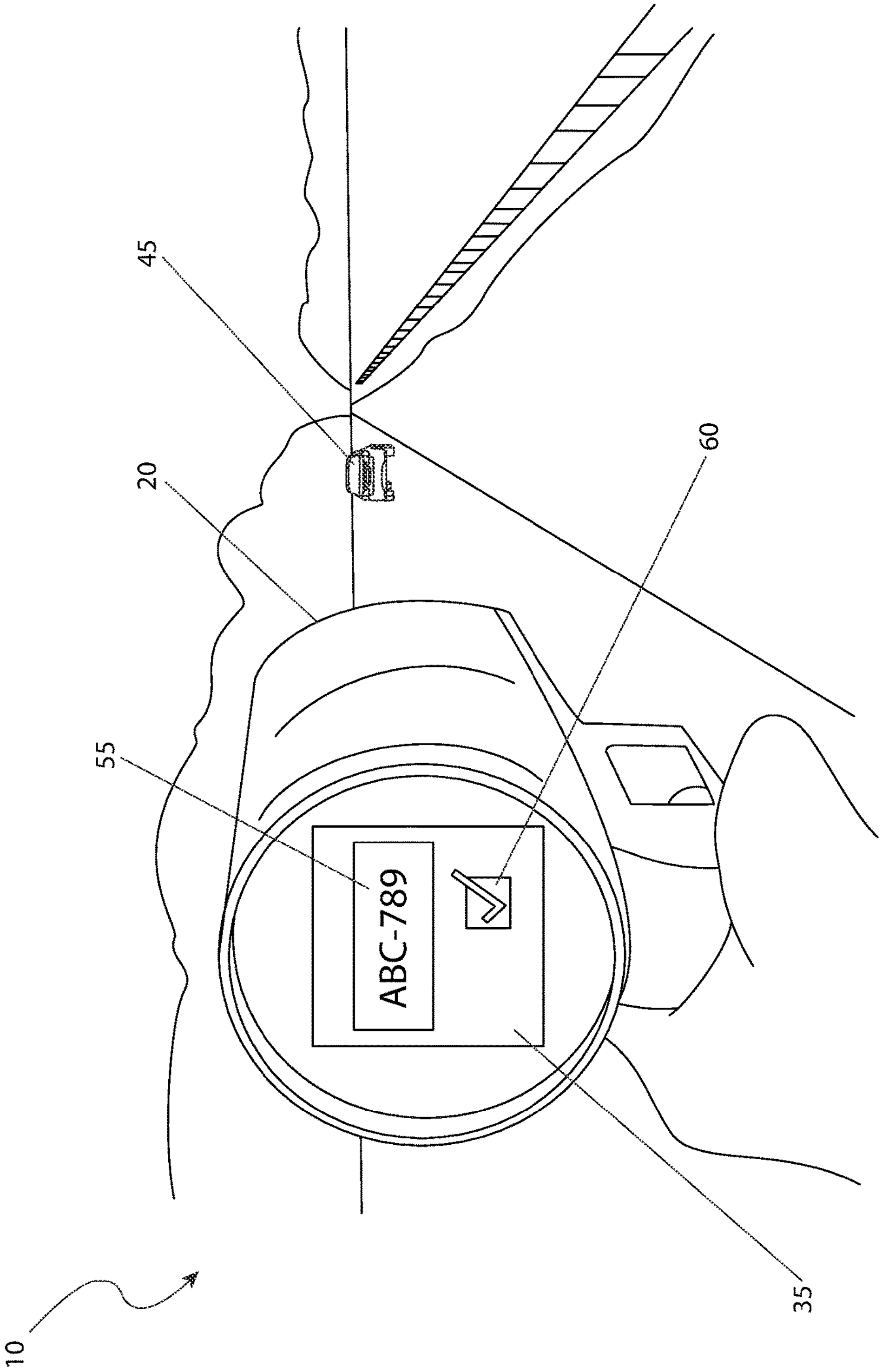
FIG. 3 is a hand-held version of the firearm alerting system 10, shown in a utilized state, according to an alternate embodiment of the present invention; and, FIG. 4 is a process utilization view of the firearm alerting system 10, according to the preferred embodiment of the present invention.

Referring now to FIG. 3, a hand-held version of the system 10, shown in a utilized state, according to an alternate embodiment of the present invention is shown. The alternate embodiment of the system 10 would be designed for portable hand-held use away from a law enforcement vehicle 15 (as shown in FIGS. 1 and 2). This usage is envisioned to be beneficial for use by law enforcement officers 40 who may be on a motorcycle, bicycle, horse, or the like. It would see use in parking lots, previously stopped or abandoned suspect vehicle 45, or suspect vehicle 45 that are at the scene of another crime, accident, or the like. The alternate embodiment of the system 10 would be provided with at least one (1) front-mounted sensor 20, an electronic display 35 which displays the license plate text information 55 and the possible firearm present indicia 60 as aforementioned described. Usage and alerting functionality of the alternate embodiment of the system 10 would remain as previously described for the preferred embodiment.

Figure 4:
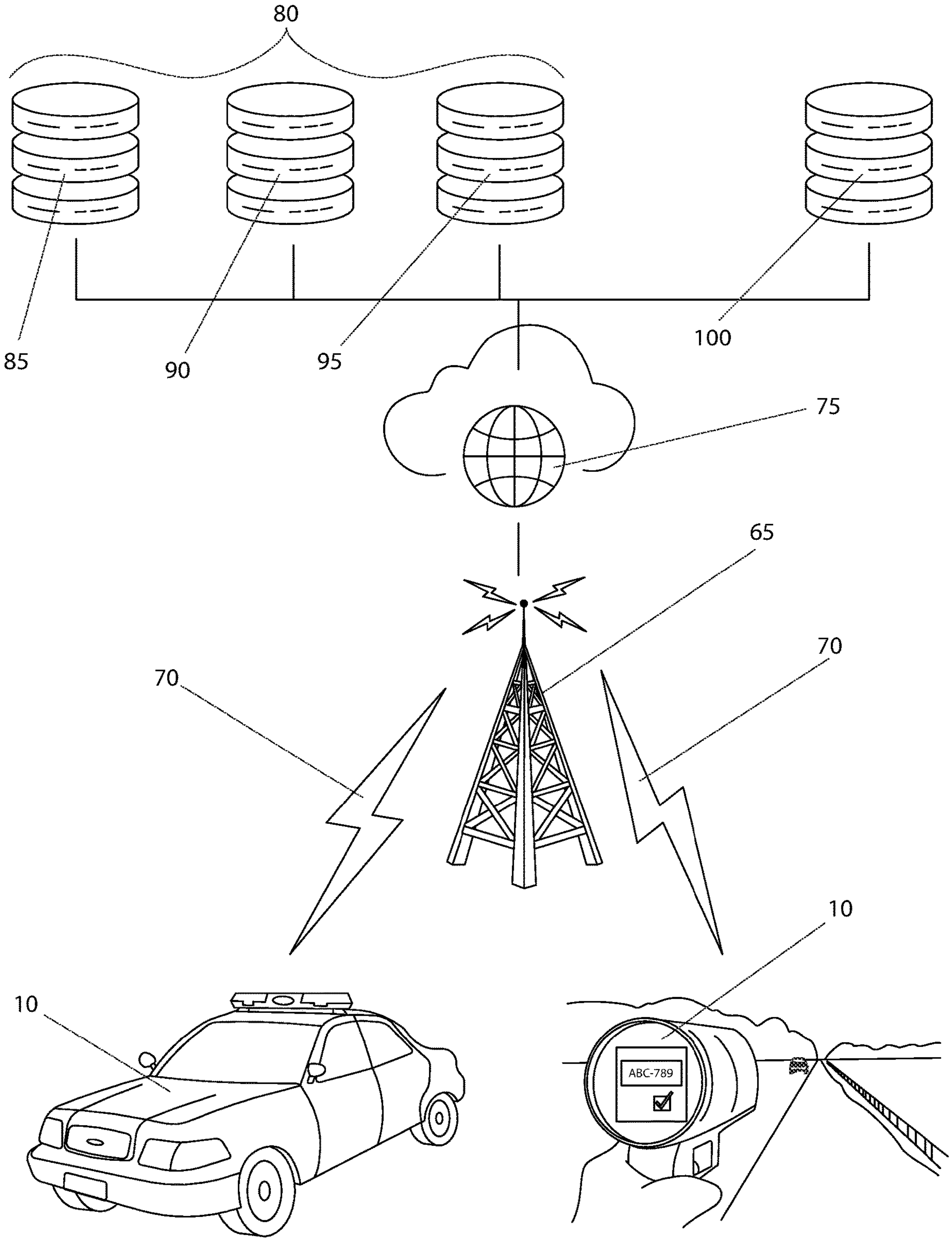

Referring to FIG. 4, a process utilization view of the firearm alerting system for traffic stops 10, according to the preferred embodiment of the present invention is disclosed. Both the preferred embodiment of the system 10 (as shown in FIGS. 1 and 2) as well as the alternate embodiment of the system 10 (as shown in FIG. 3) communicate with a radio communication site 65 via multiple radio frequency (RF) waves 70. The radio communication site 65 maybe a cellular data tower, a municipal radio system, a subscription radio system, a proprietary radio system or the like. The use of a any particular type of a radio communication site 65 is not intended to be a limiting factor of the present invention.

The radio communication site 65 is in direct electronic communication with the internet 75. The internet 75 provides pathway access to firearm databases 80. The firearm databases 80 would be multiple in nature and are envisioned to include a concealed carry permit database 85. A firearm owner database 90, and a prior criminal activity with a firearm database 95 at a minimum. All of the firearm databases 80 would be queried and cross-referenced with a license plate database 100 for possible matches. Upon a match, the system 10 will produce a possible firearm present indicia 60 on either the electronic display 35 of the preferred embodiment as shown in FIG. 2 or alternate embodiment of FIG. 3.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 4. The user would procure the system 10 from conventional procurement channels such as law enforcement equipment retailers, electronic monitoring wholesalers, mail order and internet supply houses and the like. Special attention would be paid to the acquisition of the preferred embodiment of the system 10 to be installed in a law enforcement vehicle 15, or the alternate handheld embodiment of the system 10.

After procurement and prior to utilization, the firearm alerting system for traffic stops 10 would be prepared in the following manner: various access requests to the firearm databases 80, including the concealed carry permit database 85, the firearm owner database 90, the prior criminal activity with a firearm database 95 as well as the license plate database 100 would be requested, reviewed, authorized and granted. The preferred version would be installed on the law enforcement vehicle 15 with the sensors 20 being provided a forward-facing view 25 and necessary modifications to allow the electronic display 35 to be viewable to the law enforcement officer 40 on the interior 30. At this point in time the preferred or alternate embodiments of the system 10 are ready for utilization.

During utilization of the system 10, the following procedure would be initiated: in the case of the preferred embodiment, the system 10 remains active at all times and accesses the license plate 50 of any suspect vehicle 45 by the sensors 20. Upon receiving license plate text information 55 from the sensors 20, the system 10 will access various firearm databases 80, including the concealed carry permit database 85, the firearm owner database 90, the prior criminal activity with a firearm database 95 and cross-reference them with the license plate database 100. A corresponding possible firearm present indicia 60 would be provided in near real time, and would be readily available by the time the law enforcement officer 40 exits the law enforcement vehicle 15 and approaches the suspect vehicle 45. As such, the law enforcement officer 40 would be warned and alerted to be cautious for the presence of a firearm and the possibility of being ambushed, thus greatly improving the overall safety of the law enforcement vehicle 15. A similar action is provided by the alternate embodiment of the system 10 as shown in FIG. 3.

The system 10 continues operations in a cyclical and repetitive manner, producing corresponding possible firearm present indicia 60 for the law enforcement officer 40 to use for their increased knowledge and protection.

The features of the system 10 are envisioned to provide the following benefits: cross-referencing of firearm owners or concealed carry owners to their license plate information; providing law enforcement officers 40 more complete information as to the type of person they might be dealing with in a roadside traffic stop or other police encounter; enhancing accuracy, reliability, ability to prevent or curtail crime, providing possible firearm detection, saving lives, and installing applications in municipal, state, federal and military sites and systems throughout the world.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A firearm alerting system for alerting a law enforcement officer a vehicle has a firearm, the system consisting of:

a law enforcement vehicle, the law enforcement vehicle having an exterior, an interior and one or more sensors, wherein the one or more sensors are coupled to the exterior of the law enforcement vehicle;

an electronic display, the electronic display being visible to the law enforcement officer in the law enforcement vehicle;

one or more of the one or more sensors reading a license plate of a suspect vehicle; and the read license plate being associated with an entry in one or more firearm databases, the associated entry of the one or more firearm databases forming an information, wherein the information from the firearm owner database is displayed on the electronic display.

2. The system according to claim 1, wherein at least one of the one or more sensors is an electronic camera.

3. The system according to claim 1, wherein the one or more sensors are configured to discern text-based indicia using artificial intelligence (AI).

4. The system according to claim 3, wherein the discerned text-based indicia is stored in a recognizable file.

5. The system according to claim 1, wherein the one or more sensors having a forward-facing view.

6. The system according to claim 1, wherein the information from the firearm owner database being displayed is the license plate number.

7. The system according to claim 1, wherein the one or more sensors detect a speed of a vehicle.

8. The system according to claim 7, wherein the speed of the vehicle being displayed on the electronic display.

9. The system according to claim 1, wherein information from a firearm owner database is compared with the one or more firearm databases, wherein a match of the information from the firearm owner database with the one or more firearm databases entry being displayed on the electronic display, wherein the law enforcement officer is alerted to a possible firearm in the suspect vehicle.

10. The system according to claim 1, wherein the electronic display is activated when the read license plate of the suspect vehicle matches the one or more firearm databases.

11. The system according to claim 1, wherein the system is portable.

12. The system according to claim 1, wherein the system is configured to be used in a parking lot.

13. The system according to claim 1, the system communicates with a radio communication site.

14. The system according to claim 13, wherein the system communicates with the radio communication site is via multiple radio frequency (RF) waves.

15. The system according to claim 13, wherein the radio communication site is a cellular data tower.

16. The system according to claim 14, wherein the radio communication site is a municipal radio system.

17. The system according to claim 14, wherein the radio communication site is a proprietary radio system.

18. The system according to claim 14, wherein the radio communication site is a subscription radio system.

19. The system according to claim 14, wherein the radio communication site is in direct electronically communication with an internet.

20. The system according to claim 19, wherein the internet configures a pathway to access the one or more firearm databases.

* * * * *